United States Patent [19]

Aebi

[11] Patent Number: 4,733,995
[45] Date of Patent: Mar. 29, 1988

[54] MILLING CUTTER FOR MACHINING T-SHAPED GROOVES

[75] Inventor: Gilbert Aebi, Trelex, Switzerland

[73] Assignee: Stellram S.A., Nyon, Switzerland

[21] Appl. No.: 899,962

[22] Filed: Aug. 25, 1986

[30] Foreign Application Priority Data

Sep. 13, 1985 [CH] Switzerland ............... 3985/85

[51] Int. Cl.⁴ ............... B23C 5/08; B23C 5/10; B23C 5/22
[52] U.S. Cl. ...................... 407/34; 407/40; 407/48
[58] Field of Search ............... 407/34, 35, 36, 40, 407/47, 48, 53; 144/218, 219, 240, 241; 408/224, 713

[56] References Cited

U.S. PATENT DOCUMENTS

| 3,195,376 | 7/1965 | Bader | 408/713 |
| 3,555,644 | 1/1971 | Owen | 407/36 |

FOREIGN PATENT DOCUMENTS 1905038 8/1970 Fed. Rep. of Germany .
2016337 9/1979 United Kingdom ............... 407/47
2079656 1/1982 United Kingdom ............... 407/36

OTHER PUBLICATIONS

Carboly "Futurmill" Catalog, p. 33, General Electric, Nov. 15, 1979.
"Eigenschaften, Herstellung und Bearbeitung Faserverstarkter Kunststoffe", *Werkstatt und Betrieb*, vol. 117, No. 4, Apr. 1984, pp. 235–239.

*Primary Examiner*—Frederick R. Schmidt
*Assistant Examiner*—William E. Terrell
*Attorney, Agent, or Firm*—Young & Thompson

[57] ABSTRACT

A milling cutter for machining T-shaped grooves comprises a shaft (1), the free end of which has a disc-shaped head (2) which comprises first blind recesses (3) opening toward its periphery and toward its frontal face (4) and second blind recess (5) angularly displaced with respect to the first recess (3), opening toward the periphery of the disc ad toward its rear face. Each of these recesses (3,5) comprises a seating (7), against which an indexable hard metal cutting insert (11) is fastened.

4 Claims, 4 Drawing Figures

MILLING CUTTER FOR MACHINING T-SHAPED GROOVES

BACKGROUND OF THE INVENTION

1. Field of the Invention

The present invention relates to cutting tools for the machining of metals and has more particularly for its object a milling cutter for machining T-shaped grooves.

2. Description of the Prior Art

Up to now, the machining of T-shaped grooves has always been a problem due to the lack of rigidity of the milling cutters available on the market, the head of which, particularly in the case of an embodiment having indexable hard metal inserts such as known today, has only a thin wall of material to support the said inserts. Therefore, the relatively great cutting forces to which these milling cutters are subjected, their head having been received in the piece to be machined, very rapidly generate vibrations, even at slow feed rate. Thus it has not been possible to use tools having hard metal indexable inserts without breaking the cutting edges of these inserts and as a consequence, the tool does not cut any more after a very short time. This is why milling cutters in high speed steel are now preferred which are more ductile than the sintered carbides, but it is evident that the efficiency of such tools is not comparable with the cutting performance that one can obtain with modern tools equipped with hard metal cutting inserts, such as tungsten carbide.

The small thicknesses of the aforementioned walls are due to the important void, traversing through all the axial height of the head of the milling cutter, which has been up to now been provided before each of the teeth to improve the formation and discharge of the chips. But as has been seen hereabove, these milling cutters are disadvantageously subject to vibrations since these walls bend during cutting, the said vibrations accelerating the wearing off of the cutting edges of the tool.

SUMMARY OF THE INVENTION

The present invention has for its object to overcome the above-mentioned disadvantages and to enable the realisation of a milling cutter for machining T-shaped grooves permitting the use of efficient indexable hard metal cutting inserts, and thus to obtain high efficiency while having excellent capability for evacuating the chips.

The milling cutter of the present invention is distinguished by the characteristics recited in claim 1.

BRIEF DESCRIPTION OF THE DRAWINGS

The accompanying drawing shows schematically and by way of example one embodiment of the milling cutter for machining T-shaped grooves according to the invention, in which.

DETAILED DESCRIPTION OF THE INVENTION

Figure 1:
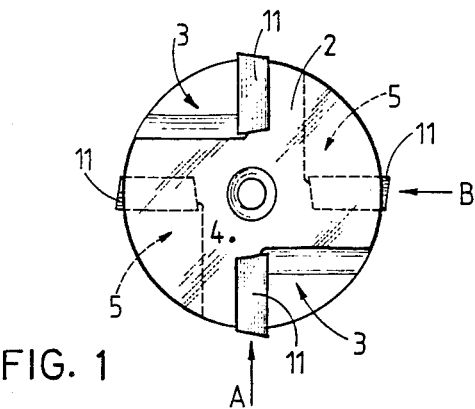
FIG. 1 is a frontal view of the milling cutters.
Figure 2:
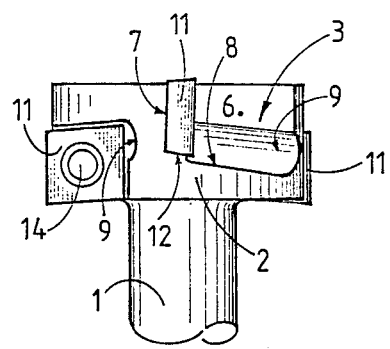
FIG. 2 is a side view along arrow A of FIG. 1.
Figure 3:
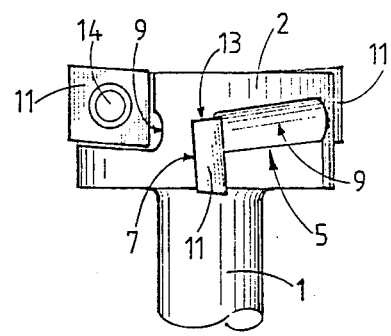
FIG. 3 is a side view along arrow B of FIG. 1.
Figure 4:
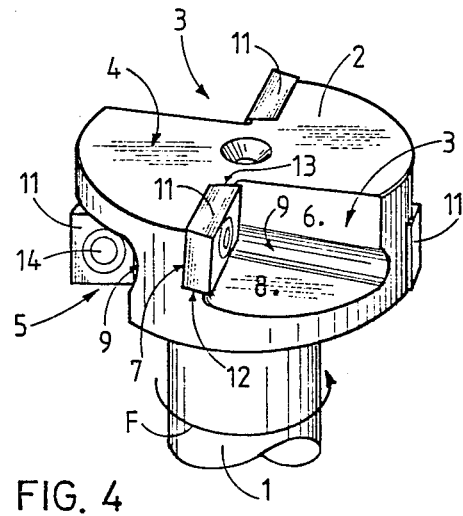
FIG. 4 is a perspective view on an enlarged scale.

The milling cutter for the machining of T-shaped grooves shown comprises a shaft 1 the end of which (not shown) is intended to be fastened on the spindle of a machine tool for its driving into rotation in the direction of the arrow F. This shaft terminates by a head 2 having the general shape of a disc.

The disc 2 comprises blind recesses 3, opening toward the periphery of the head and toward its frontal or terminal face 4, diametrically opposed with respect to the shaft of rotation of the milling cutter. This disc 2 comprises further dead housings 5, also diametrically opposed but angularly displaced with respect to the dead housings 3, opening toward the periphery of the disc 2 and toward its rear face on the side of the axis 1.

Each recess 3,5 comprises two lateral faces 6,7 approximately at right angles to each other and parallel to the shaft 1, as well as a bottom 8. A rounded portion 9 is provided in the zones where the face 6 and the bottom 8 would intersect in order to avoid sharp angles which could constitute the start of a rupture and hinder the formation and discharge of the chips.

The lateral face 7 of the housings 3,5 is used as a positioning face and seating for an indexable hard metal cutting insert 11. This insert is positioned on said face through shoulders 12,13 and fastened in its seating for example by means of a central screw 14.

In the embodiment shown, one thus obtains a cutting tool comprising four cutting inserts, axially displaced two by two and the peripheral cutting edges of which are overlapping to machine the height of the T-shaped groove and its lateral walls whereas the radial cutting edges of two plates machine the bottom of the groove and the ones of the two other cutting plates the upper surfaces of the T-shaped groove.

The milling cutter thus realized is extremely rigid thanks to its disc-shaped head comprising dead housings; it vibrates very little or virtually not at all, which permits the use of hard metal cutting inserts and thus a high cutting efficiency.

Tests realized with such a milling cutter have shown that it is possible to machine a given T-shaped groove with feed rates 3 to 6 times higher than those now possible with the existing milling cutters, as shown by the test results reported herebelow.

(a) with a milling cutter according to the old conception, having a traditional toothing provided with indexable cutting inserts having a E-shape, the tests made in construction steel at a cutting speed of about 100 m/min, have shown that a feed rate per tooth of about 0.03 mm could not be increased without provoking vibrations and tending to break of the milling cutter.

Test No. 1:
T-slot milling cutter, diameter 18 mm, z=2×2 teeths
Cutting speed V=98 m/min
Feed of the table S=99 mm/min
Feed per tooth $s_z$=0.028 mm/tooth Test No. 2:
T-slot milling cutter, diameter 25 mm, z=2×2 teeths
p1 Cutting speed V=102 m/min
Feed of the table S=82 mm/min
Feed per tooth $s_z$=0.031 mm/tooth (b) with a milling cutter according to the invention provided with indexable cutting plates having the shape of a M. The tests made in construction steel, at a cutting speed of about 130 to 140 m/min, have permitted obtaining without any problem a feeding rate per tooth of 0.15 mm to 0.20 mm.

Test No. 1:
T-slot milling cutter, diameter 18 mm, z=2×2 teeths
Cutting speed V: 127 m/min
Feed of the table S=450 mm/min
Feed per tooth $s_z$=0.10 mm/tooth Test No. 2:
 T-slot milling cutter, diameter 25 mm, $z=2\times 2$ teeths
 Cutting speed $V=140$ m/min
 Feed of the table $S=540$ mm/min
 Feed per tooth $s_z=0.15$ mm/tooth Test No. 3:
 T-slot milling cutter, diameter 32 mm, $z=2\times 2$ teeths
 Cutting speed $V=140$ m/min
 Feed of the table $S=720$ mm/min
 Feed per tooth $s_z=0.20$ mm/tooth What is particularly surprising is that even with high feed rates per tooth the formation and discharge of the chips are perfectly obtained, despite the head of the milling cutter having no axial through passage, which thus substantially reduces the volume of the chip chamber; all the chips are evacuated laterally through the portion of the grooves already machined and, further, do not interfere between the surface of the groove machined and the body of the cutter, as happens with the conventional milling cutter having traversing housing. This is sufficiently surprising that specialists in the machining of metals would not believe it possible to use of such a milling cutter without its rapid destruction and would doubt its performance until they have seen it work with their own eyes.

Alternatively, it is evident that the number of housings 3,5, and thus of cutting inserts, could be different than four.

I claim:

1. Cutting tool for machining T-shaped grooves, comprising a shaft having a first end adapted to be fixed to the spindle of a machine for driving said shaft in rotation, and a second end comprising a disc-shaped head; said head comprising a peripheral region and first and second surfaces directed toward and away from said shaft, respectively, first recesses opening on said peripheral region and said first face of said disc, second recesses angularly offset from said first recesses and opening on said peripheral regions in said second face of said disc, each said recess comprising a seating adapted to receive a removable, indexable cutting insert; each of said first and second recesses comprising first, second and third uniplanar surfaces all adjacent to one another, said first and second surfaces extending axially of said disc-shaped head, and said first surface comprising said seating, said first and second surfaces together forming a right angle, each of said first and second surfaces extending to said peripheral region of said disc-shaped head.

2. Cutting tool according to claim 1, wherein each of said first and second recesses receives a said cutting insert, said cutting inserts in said first recesses being circumferentially and axially offset relative to said cutting inserts in said second recesses, and overlapping axially of said disc-shaped head.

3. Cutting tool according to claim 1, wherein said third surface extends at an oblique angle relative to a radial plane of said disc-shaped head.

4. Cutting tool according to claim 1, wherein said second and third surfaces are interconnected by a rounded surface.

* * * * *